United States Patent
Tran (10) Patent No.: US 10,054,156 B2
(45) Date of Patent: Aug. 21, 2018

(54) SYNTHETIC RESIN RETAINER FOR LARGE THRUST BALL BEARINGS WITH DRY-LUBRICANT AND WET-LUBRICANT MANAGEMENT SYSTEMS

(71) Applicant: ATEC Corporation, Cypress, CA (US)

(72) Inventor: Anh Tran, Cypress, CA (US)

(73) Assignee: ATEC CORPORATION, Cypress, CA (US)

(*) Notice: Subject to any disclaimer, the term of this patent is extended or adjusted under 35 U.S.C. 154(b) by 0 days.

(21) Appl. No.: 15/193,077

(22) Filed: Jun. 26, 2016

(65) Prior Publication Data
US 2017/0370406 A1 Dec. 28, 2017

(51) Int. Cl.
F16C 19/10 (2006.01)
F16C 33/38 (2006.01)
F16C 33/66 (2006.01)
F16C 33/44 (2006.01)

(52) U.S. Cl.
CPC .......... *F16C 19/10* (2013.01); *F16C 33/3806* (2013.01); *F16C 33/3818* (2013.01);
(Continued)

(58) Field of Classification Search
CPC .......... F16C 19/10; F16C 19/16; F16C 19/30; F16C 19/36; F16C 33/3806;
(Continued)

(56) References Cited

U.S. PATENT DOCUMENTS 1,538,564 A * 5/1925 Leon ...................... F16C 19/10
384/609
2,072,515 A * 3/1937 Delaval-Crow ...... F16C 33/427
384/614
(Continued)

FOREIGN PATENT DOCUMENTS

DE 18 66 122 U 1/1963
DE 1234455 B * 2/1967
(Continued)

OTHER PUBLICATIONS

CN 103032459 A, Dual Axis Combination Bearing Inner Ring Support Part Outer Raceway Portion Connect Frame Retain Arrange, Jiang B, China, Apr. 10, 2013.*

*Primary Examiner* — Marcus Charles
(74) *Attorney, Agent, or Firm* — Lewis B. Sternfels (57) ABSTRACT

A large thrust ball bearing, retainer, and raceways, using a surface treatment such as hard anodize, lowers the friction and wear. The retainer, molded in synthetic resin with self-lubricated material reinforced with carbon fiber such as $MoS_2$, and PTPE, eliminates the thermal viscosity. Multi-segment retainers, each with an inner race-guided configuration, an alternative ball pocket cross-section design with a slotted configuration, reduce the thermal effects, improve the producibility of the retainer, and reduce the manufacturing cost. The pocket design with an oval cross-section instead of a circular cross-section also reduces the localized thermal-induced effect which would otherwise result in a pinching condition between the ball and the retainer. The alternative
(Continued)

slotted retainer pocket design increases the compliance between ball/pocket interfaces, which helps to reduce the dynamic effects. The ends of the retainer segments are designed to reduce the interactive transferring, circumferential force between two adjacent segments.

23 Claims, 5 Drawing Sheets (52) U.S. Cl.
CPC ........ *F16C 33/3887* (2013.01); *F16C 33/445* (2013.01); *F16C 33/6622* (2013.01); *F16C 33/6651* (2013.01); *F16C 33/6659* (2013.01); *F16C 33/6688* (2013.01); *F16C 33/6696* (2013.01); *F16C 2208/02* (2013.01); *F16C 2208/04* (2013.01); *F16C 2208/32* (2013.01); *F16C 2223/70* (2013.01); *F16C 2300/14* (2013.01)

(58) Field of Classification Search
CPC  F16C 33/3818; F16C 33/3887; F16C 33/467; F16C 33/4635; F16C 33/565; F16C 33/6611; F16C 2300/14
USPC ....... 384/523, 528, 590, 606, 609, 614, 618, 384/621, 623
See application file for complete search history.

(56) References Cited

U.S. PATENT DOCUMENTS

| | | | | |
|---|---|---|---|---|
| 3,966,284 A * | 6/1976 | Martin | ............... | F16C 19/10 384/623 |
| 4,523,863 A * | 6/1985 | Okoshi | ............... | F16C 19/10 384/609 |
| 5,123,756 A * | 6/1992 | Amen | ............... | F16C 19/36 384/551 |
| 5,293,688 A * | 3/1994 | Koch | ............... | F16C 19/30 29/898.041 |
| RE35,860 E * | 7/1998 | Ward | ............... | F16C 33/32 384/492 |
| 6,883,970 B2 * | 4/2005 | Horley | ............... | F16C 19/305 384/623 |
| 8,414,192 B2 * | 4/2013 | Sekimoto | ............... | F16C 33/3812 384/523 |
| 8,882,361 B2 * | 11/2014 | Sekido | ............... | E02F 9/123 384/591 |
| 8,997,611 B1 * | 4/2015 | Walton | ............... | B23P 15/003 384/451 |
| 9,039,290 B2 * | 5/2015 | Takahashi | ............... | F16C 19/30 384/623 |
| 2003/0235357 A1 * | 12/2003 | Hiramatsu | ............... | F16C 19/163 384/513 |
| 2007/0297705 A1 * | 12/2007 | Hosoya | ............... | F16C 33/3818 384/462 |
| 2009/0208161 A1 * | 8/2009 | Jauernig | ............... | F16C 19/34 384/572 |

FOREIGN PATENT DOCUMENTS

| | | | | |
|---|---|---|---|---|
| DE | 3300655 A * | 7/1984 | ............... | F16C 33/46 |
| DE | 35 12 202 A1 | 10/1986 | | |
| EP | 1 847 727 A1 | 10/2007 | | |
| FR | 2537676 A1 * | 6/1984 | ............... | F16C 33/4605 |
| GB | 1470062 A * | 4/1977 | ............... | B66C 23/84 |
| GB | 2104600 A * | 3/1983 | ............... | F16C 19/24 |
| JP | 2002059935 A * | 2/2002 | | |
| JP | 2002155950 A * | 5/2002 | ............... | F16C 33/3812 |
| JP | 2002266875 A * | 9/2002 | | |
| JP | 2002 295478 A | 10/2002 | | |
| JP | 2003 013963 A | 1/2003 | | |
| JP | 2006300183 A * | 11/2006 | | |
| JP | 2007 092957 A | 4/2007 | | |
| JP | 2007263304 A * | 10/2007 | ............... | F16C 33/513 |
| JP | 2014173657 A * | 9/2014 | ............... | F16C 19/364 |
| KR | 100872499 B1 * | 12/2008 | | |
| WO | WO 9207117 A1 * | 4/1992 | ............... | F16C 33/30 |

* cited by examiner

SYNTHETIC RESIN RETAINER FOR LARGE THRUST BALL BEARINGS WITH DRY-LUBRICANT AND WET-LUBRICANT MANAGEMENT SYSTEMS

CROSS-REFERENCE TO RELATED APPLICATION

Not Applicable

REFERENCE REGARDING FEDERAL SPONSORSHIP

Not Applicable

REFERENCE TO MICROFICHE APPENDIX

Not Applicable

BACKGROUND OF THE INVENTION

1. Field of the Invention

This invention is related to ball bearings in general and, more particularly, to ball bearing retainers (also known as separators or cages) and a lubrication management system for large thrust ball bearings and to an integrated angular contact thrust bearing system.

2. Description of Related Art and Other Considerations

A conventional ball bearing assembly typically contains four basic components comprising an outer or top ring, an inner or bottom ring, a ball retainer (separators or cages) sandwiched between the two rings, rolling elements or ball bearings held by the ball retainer and a lubricant. The ball retainer and its contained rolling elements bearings form a ball bearing-retainer or bearing assembly. The bearing assembly has its rolling elements circumferentially spaced apart from one another and between the two rings. Thus, the retainer maintains the circumferential spacing between adjacent roller elements. The retainer is typically a single piece part having cylindrical holes or pockets to hold the ball bearings.

A conventional thrust ball bearing retainer is formed as a solid single-piece component and ordinarily provides a satisfactory means for retaining spacing rolling elements around the bearing raceways for small and medium sized bearings, such as having a pitch diameter which is less than 6". However, for large or larger thrust ball bearings, such large thrust ball bearings become very expensive to make or even become un-producible resulting from such distortions as excessive out-of-round, out-of-flatness, and torsional wrap. In addition, for applications requiring extreme operating temperatures, such solid, single-piece retainers become a limiting factor due to thermal induced binding resulting from a coefficient of thermal expansion mismatch between the retainer and raceway materials. In addition, conventional thrust ball bearing retainers are designed for use with liquid lubricants and may not work at all when liquid lubricants are not applicable or otherwise not to be used. This results in limiting their use in applications where liquid lubricants are not applicable, such as where the ambient cold operating temperature is less than the pour point temperature of any liquid lubricant or where the ambient hot operating temperature exceeds the flash point temperature of any liquid lubricant or where the running torque excursions due to temperature levels do not meet a particular system capability or performance.

SUMMARY OF THE INVENTION

In the present invention, the thrust ball bearing comprises an outer or top and inner or bottom rings, a plurality of rolling elements, which are mounted between the rings, and a retainer for retaining circumferentially spaced rolling elements apart from one another. The different configuration includes the following improvements.

The retainer is segmented into multiple circular arc pieces in which each piece holds a given number of balls. The number of retainer segments is selected accordingly in order to reduce thermal induced effects on torque, sliding friction torque and dynamics induced effects between the retainer segments and other bearing components (i.e., ball, bearing rings, etc.).

The retainer ends of the segments are rounded to minimize the radially transferring forces and the retainer wear between two adjacent segments.

The retainer segments are designed to have a guided feature on the inner or bottom raceway shoulders. This double inner or bottom raceway shoulder guided feature minimizes the retainer dynamic instability and the pocket wear due to a much lower retainer/inner raceway relative velocity as compared with the conventional ball guided retainer or double outer and inner raceway shoulder guided retainer. In addition, this feature also avoids excessive solid lubricant transferred from retainer pockets to balls and subsequently to raceway track/ball interfaces. Thus, excessive high torque noise is avoided due to deposited solid lubricant on raceway/ball interfaces. The single raceway shoulder guided feature from the retainer also prevent brake action when the retainer segments contact the shoulders of both lower upper raceways.

The retainer pocket is circular and the pocket/ball clearance is selected to account for the part tolerance and the thermal induced dimensional change in order to prevent the ball/retainer interference.

In the case of excessive thermal induced dimensional change due to a combination of excessive mismatch between the coefficients of thermal expansion between raceway and retainer materials and extreme operating temperature, the retainer ball pocket is selected to have an oval cross section with the major axis along the circumferential direction.

For an application where the environmental conditions exclude the use of liquid lubricants, a solid lubricant mechanism is applied as follows: (a) the bearing ring internal surfaces are modified for optimal friction and wear by an electroplating process. The anodizing thickness is selected to prevent case crushing under Hertzian contact stress between the ball and the raceway; (b) electroplated surfaces are covered with a molecular layer of per-fluorinated polyether based fluid; (c) a lubrication resupply mechanism is derived from the use of a double transfer film applied from the bearing retainer pockets to the balls and from the balls to the raceway tracks. Retainer materials are selected as a lubricant resupply reservoir and provides the needed lubricant to all bearing component interfaces through kinematic contacts; (d) the proper amount of lubricant resupply is controlled by retainer material, interface clearances, environmental operating conditions and bearing kinematic relationship between the bearing components.

For an application which the environmental conditions including the use of liquid lubricants, a liquid lubricant mechanism is applied as follows: (a) to provide the initial wear protection, bearing ring internal surfaces are modified for optimal friction and wear by electroplating process; (b) synthetic hydrocarbon base oils provide good lubricity and low wear in a slow-to-moderate speed application as this thrust ball bearings. Greases or oils can be used. The proper choice of these forms of lubricants depends on allowable resistance bearing torque, operating temperature, speed, and torque noise; (c) retainer material is a molded, synthetic resin with added fillers to increase strength and to reduce wear rate, (d) the proper amount of lubricant resupply is controlled by retainer material, interface clearances, environmental operating conditions and bearing kinematic relationship between the bearing components.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings, like references indicate like parts or features.

DETAILED DESCRIPTION OF THE INVENTION

Figure 1:
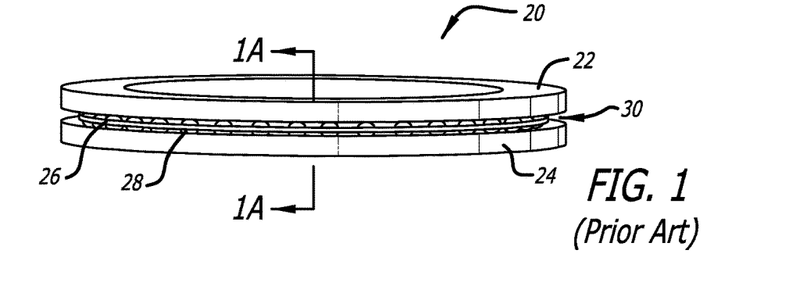
FIG. 1 is an isometric view of a conventional or prior art thrust ball bearing assembly.
Figure 1A:
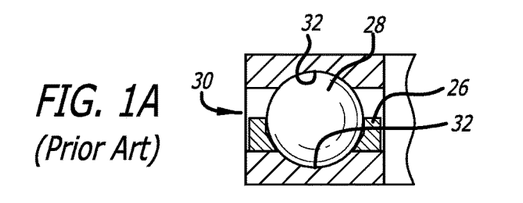
FIG. 1A is a cross-section taken along line 1A-1A of FIG. 1.
Figure 2:
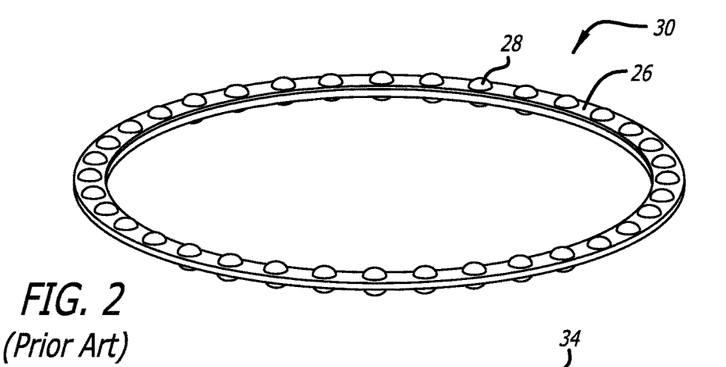
FIG. 2 is an isometric view of the conventional, single-piece, thrust ball bearing retainer and its contained ball bearings as shown in the FIG. 1 assembly.
Figure 3:
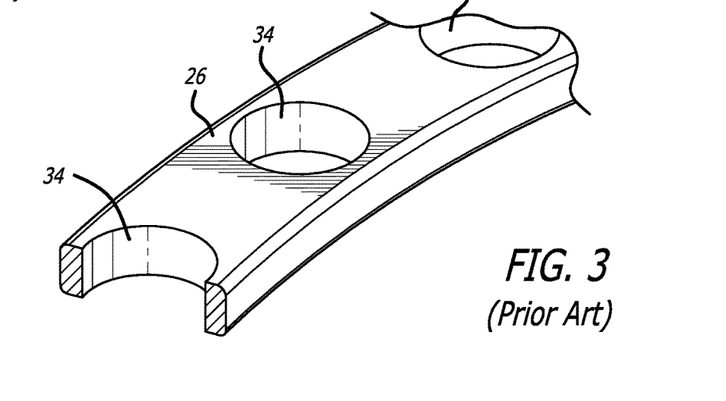
FIG. 3 is an isometric view of a section of the conventional thrust ball bearing retainer with cylindrical pockets of the thrust ball bearing assembly as illustrated in FIGS. 1 and 2.
Figure 4:
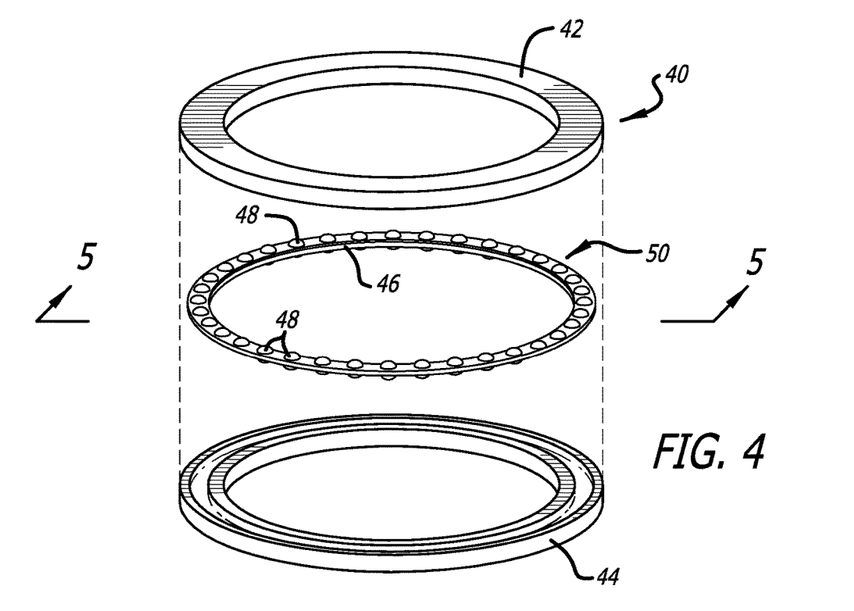
FIG. 4 is an isometric exploded view of a preferred embodiment of the present invention comprising a thrust ball bearing assembly in which its ball bearing retainer has individual thrust ball bearing pockets with wedges for supporting the several ball bearings.
Figure 5:
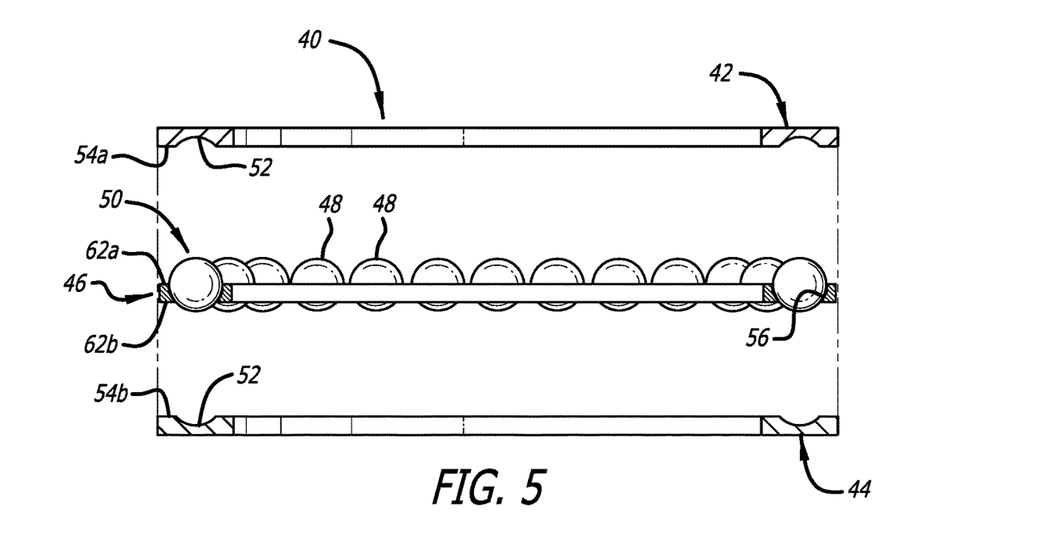
FIG. 5 is an exploded view of the embodiment shown in FIG. 4 taken along cross-section line 5-5 thereof.

A conventional ball bearing assembly typically contains four basic components as depicted in FIGS. 1-3. Such a prior art assembly, denoted by indicium 20, comprises an outer or top ring 22, an inner or bottom ring 24, a ball retainer 26 (sometimes termed separator or cage) sandwiched between rings 22 and 24, rolling elements or ball bearings 28 held by the ball retainer. A lubricant (not shown) is often included. Ball retainer 26 and its contained rolling elements bearings 28 form an assembly 30 as best seen in FIG. 2. Each ring 22 and 24 include a race 32 as best shown in FIG. 1A for ball-bearings 28.

Bearing assembly 30 has its rolling elements 28 circumferentially spaced apart from one another and between outer or top ring 22 and inner or bottom ring 24. Thus, retainer 26 maintains the circumferential spacing between adjacent roller elements 28. The retainer is typically a single piece part with cylindrical holes or pockets 34.

A conventional thrust ball bearing retainer, such as retainer 26, which is formed as a solid, single-piece component, ordinarily provides a satisfactory means for retaining spacing rolling elements 28 around the bearing raceways for small and medium sized bearings, such as those having a pitch diameter which is less than 6". However, for large or larger thrust ball bearings, such a large thrust ball bearing becomes very expensive to manufacture or even becomes un-producible due to excessive out-of-round, out-of-flatness, and torsional wrap. In addition, for applications requiring extreme operating temperatures, such solid, single-piece retainers become a limiting factor due to thermally induced binding resulting from a coefficient of thermal expansion mismatch between their retainer and raceway materials. In addition, conventional thrust ball bearing retainers are designed for use with liquid lubricants and may not work at all when liquid lubricants are not applicable or otherwise not to be used. Such a lack of a lubricant results in limiting its use in applications where liquid lubricants are not applicable, such as where the ambient cold operating temperature is less than the pour point temperature of any liquid lubricant or where the ambient hot operating temperature exceeds the flash point temperature of any liquid lubricant or such as where the running torque excursions due to temperature levels do not meet a particular system capability or performance.

Reference is now made to FIGS. 4-12 and to the embodiments of the present invention. As depicted in FIGS. 4-8, a thrust ball bearing assembly 40 comprises an outer or top ring 42, an inner or bottom ring 44, a retainer 46, and a plurality of rolling elements or ball bearings 48 retained within and spaced apart from one another by the retainer. Elements 48 are thereby mounted between outer or top ring 42 and inner or bottom ring 44. The combination of the ball bearings and the retainer forms a bearing-retainer assembly 50. Retainer 46 is generalized in FIGS. 4 and 5 as a representation which is configured into specific formulations as depicted in subsequent figures.

Figure 6:
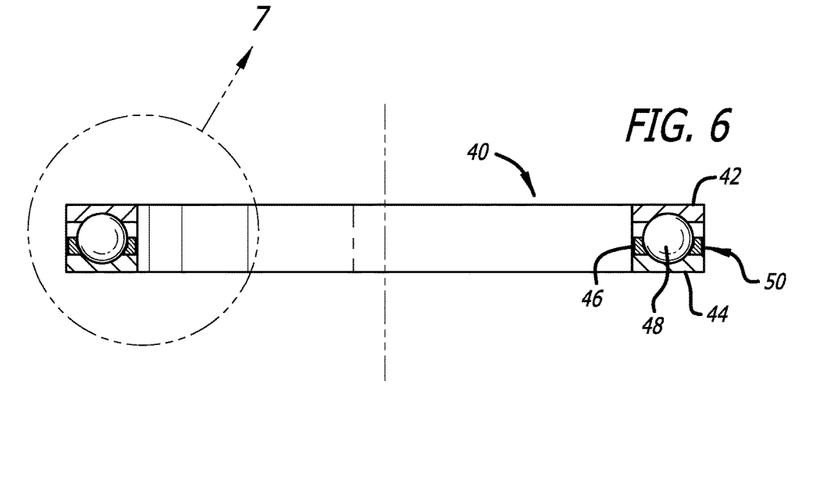
FIG. 6 is a cross-sectional view of the assembled embodiment illustrated in FIGS. 4 and 5 depicting its wedge-shaped thrust ball bearing pocket in the retainer.
Figure 7:
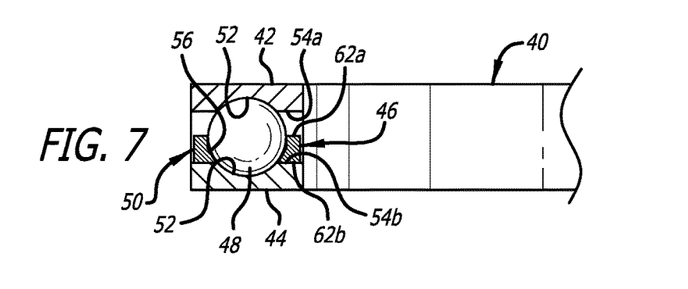
FIG. 7 is an enlarged cross-sectional view of a portion of the thrust ball bearing retainer taken along the circular line denoted "7" in FIG. 6 to better shown the wedge-shaped thrust ball bearing pocket in the retainer.
Figure 8:
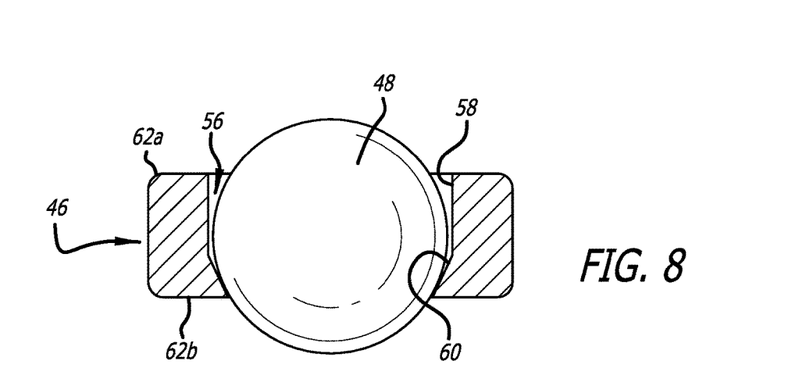
FIG. 8 is a further enlarged cross-sectional view of a single thrust ball bearing retainer pocket with a ball bearing supported therein to best show the wedge-shaped thrust ball bearing support in the retainer.

Rings 42 and 44 each are provided with bearing ring internal races or raceways 52 bounded by raceway shoulders 54a and 54b. Ball bearings 48 are disposed to be seated within the raceways and to roll therewithin. As best shown in FIG. 8, retainer 46 includes pockets 56 having openings 58 for reception of individual ball bearings. Each opening 58 has rounded parallel sides (e.g., circularly or ovally shaped as depicted and described hereinafter) to enable its ball bearing to be inserted into its pocket 56 and each parallel sided opening 58 terminates in a rounded wedge-shaped seat 60. As also illustrated in FIGS. 6 and 7, the retainer is bounded with upper and lower surfaces 62a and 62b. Upper surface 62a is spaced from raceway shoulder 54a of top ring 42. Lower surface 62b is disposed to rest upon raceway shoulder 54b of lower ring 44.

Figure 9:
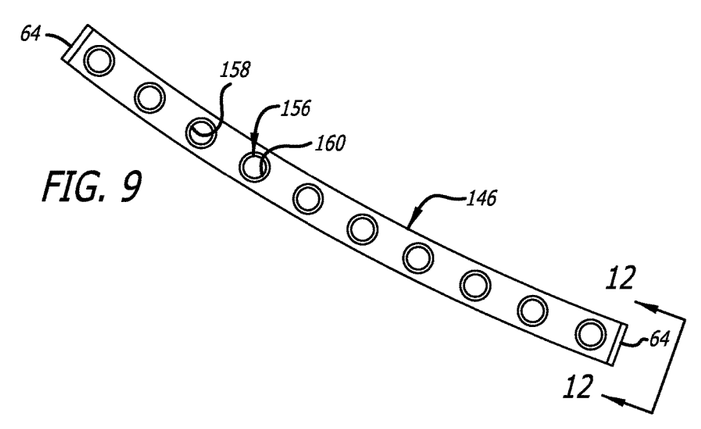
FIG. 9 is a top view of a first embodiment of a segment of the retainer employable in the thrust ball bearing assembly as shown in FIG. 4 in which the thrust ball bearing retainer has circular pockets for the ball bearings.
Figure 9A:
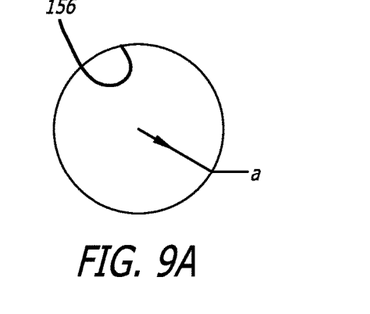
FIG. 9A is a view of the retainer circular pocket of FIG. 9.
Figure 10:
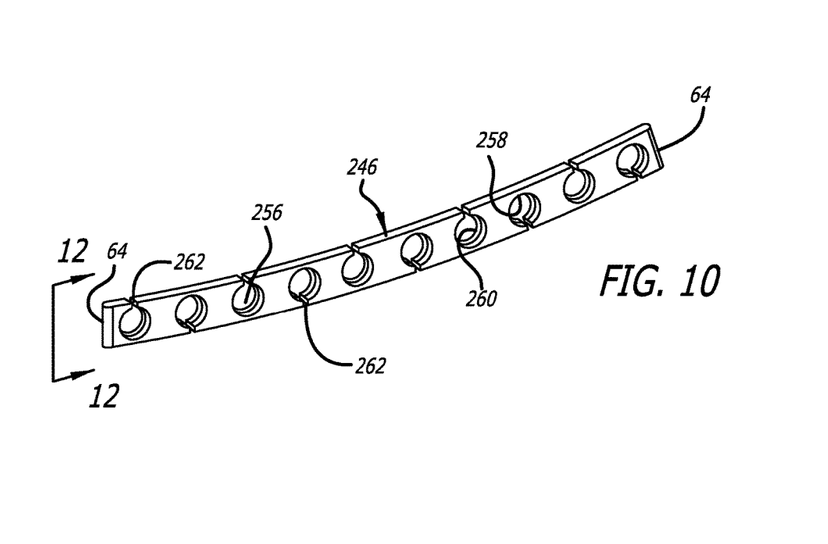
FIG. 10 is an isometric view of a second embodiment of a segment of the retainer employable in the thrust ball bearing assembly as shown in FIG. 4 in which the thrust ball bearing retainer has alternatively slotted ball pockets.
Figure 11:
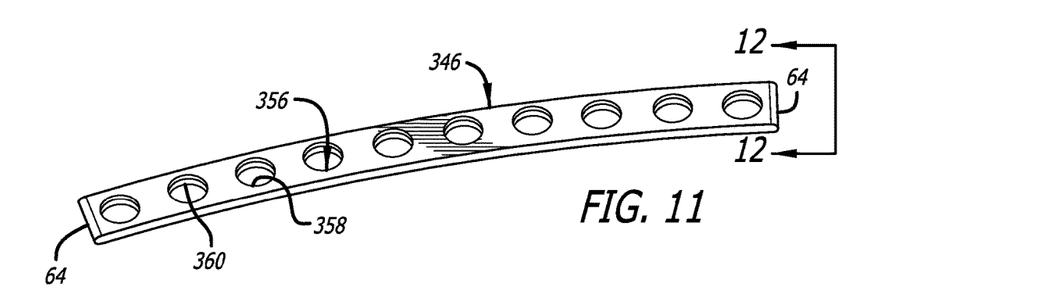
FIG. 11 is an isometric view of a third embodiment of a segment of the retainer employable in the thrust ball bearing assembly as shown in FIG. 4 in which the thrust ball bearing retainer has oval pockets for the ball bearings.
Figure 11A:
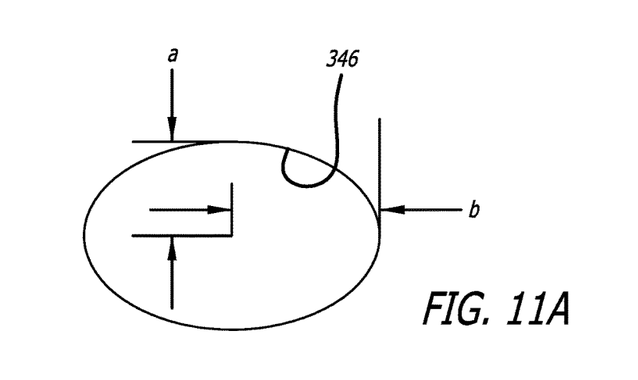
FIG. 11A is a view of the retainer oval pocket of FIG. 11 in which the letters "a" and "b" define the respective dimensions between their arrows.
Figure 12:
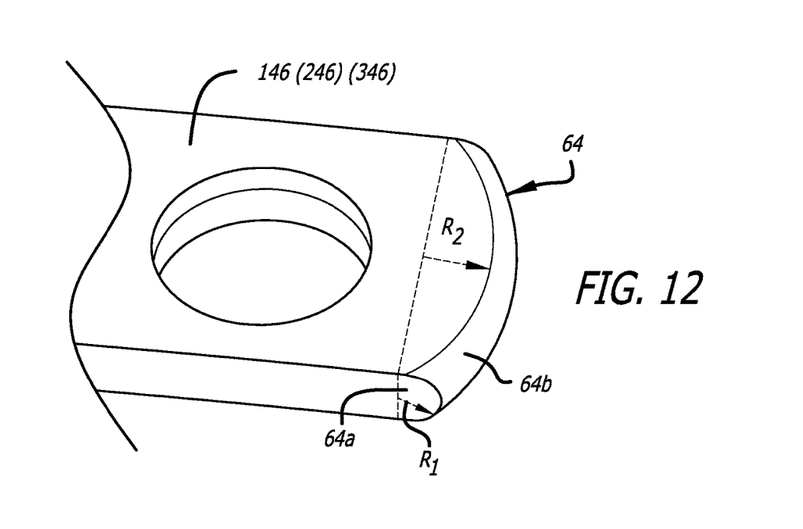
FIG. 12 is a cross-section taken along lines 12-12 of FIGS. 9-11 depicting the rounded ends having radii $R_1$ and $R_2$ terminating their respective retainer segments.

In accordance with one feature of the present invention, the retainer is segmented into multiple circular arc pieces or segments 146, 246 and 346, as illustrated respectively in FIGS. 9, 10, and 11. Each piece is designed to hold a certain number of balls. The number of retainer segments is selected in consonance with those needs such as will reduce thermal induced effects on torque, sliding friction torque and dynamics induced effects between the retainer segments and other bearing components including, but not limited to, such components as balls and bearing rings. As illustrated in FIGS. 9-11, segments 146, 246 and 346 respectively include pockets 156, 256 and 356, openings 158, 258 and 358, wedge-shaped seats 160, 260 and 360. FIGS. 9 and 9A illustrate pockets with a circular cross-section. Pockets 258 in FIG. 10, in addition to pockets also having a circular cross-section, are slotted with slots 262. Pockets 356 and 346 respectively in FIGS. 11 and 11A have an oval configuration; such a modification is described below. In FIG. 11A, the letters "a" and "b" define the respective dimensions between their arrows.

In accordance with another feature of the present invention, segments 146, 246 and 346 are each terminated with similar rounded retainer ends 64 (see FIG. 12) each having two radii 64a and 64b with respective radii dimensions, $R_1$ and $R_2$, to minimize radially transferring forces and retainer wear between adjacent segments.

In accordance with another feature of the present invention, the several retainer segments are designed to have the guided feature on the inner or bottom raceway shoulders 54b. This double inner or bottom raceway shoulder 54b guided feature minimizes the retainer dynamic instability and the pocket wear due to much lower retainer/inner raceway relative velocity as compared to the conventional ball guided retainer. In addition, this feature also avoids excessive solid lubricant transferred from retainer pockets to ball bearings and subsequently to raceway track/ball interfaces, thereby avoiding the deposit of excessive solid lubricant on raceway/ball interfaces that otherwise cause high torque noise. The single raceway shoulder guided feature from the retainer also prevent brake action when the retainer segments contact both shoulders on the lower and upper raceways.

In accordance with still another aspect of the present invention, the retainer pocket is rounded (circular or otherwise) and the pocket/ball clearance is selected to account for the part tolerance and the thermal induced dimensional change in order to prevent the ball/retainer interference.

In accordance with another feature of the present invention, in the case of excessive thermal induced dimensional change due to a combination of excessive mismatch between the coefficients of thermal expansion between raceway and retainer materials and extreme operating temperature, the retainer ball pocket is selected to have an oval cross section with the major axis along the circumferential direction. The semi-major axis dimension, a, is calculated according to the below formula:

$$a = b + \frac{\pi d}{n_{segment}}(\alpha_{retainer} - \alpha_{raceway})(T_{hot} - T_{cold}) + tol$$

where
  $b = d_{ball}*$ratio, mm
  $d_{ball}=$ball diameter, mm
  ratio=1.025-1.10, mm
  d=bearing pitch diameter, mm
  $n_{segment}=$number of retainer segments per bearing row
  $T_{hot}=$extreme operating hot temperature, ° C.
  $T_{cold}=$extreme operating cold temperature, ° C.
  $\alpha_{retainer}=$thermal coefficient of expansion for ball retainer material along the circumferential direction, 1/° C.
  $\alpha_{raceway}=$thermal coefficient of expansion for raceway material, 1/° C.
  tol=pocket diametral manufacturing tolerance, mm In accordance with another feature of the present invention, for an application which the environmental conditions excluding the use of liquid lubricants, a solid lubricant mechanism is applied as follows:

1. To provide the initial wear protection, bearing ring internal surfaces 52 are modified for optimal friction and wear by an electroplating process. For example, if bearing rings are made of structural aluminum such as 6061-T6 or 7075-T6, a hard anodizing coating, type 3, with polytetrafluoroethylene (PTFE) sealing is applied. The anodizing thickness is selected to prevent case crushing under Hertzian contact stress between the ball and the raceway.
2. In addition, electroplating surfaces 52 are covered with a molecular layer of per-fluorinated polyether based fluid such as Castrol Brayco 815z.
3. Lubrication resupply mechanism comes from the double transfer film from bearing retainer pockets to balls and from balls to raceway tracks. Retainer materials are selected as a lubricant resupply reservoir and to provide the needed lubricant to all bearing component interfaces through kinematic contacts. For example, a retainer material can be molded, synthetic resin, self-lubricated material reinforced with carbon fiber, molybdenum disulfide, and polytetrafluoroethylene (PTFE).
4. The proper amount of lubricant resupply is controlled by retainer material, interface clearances, environmental operating conditions and bearing kinematic relationship between the bearing components.

In accordance with another feature of the present invention, for an application which the environmental conditions including the use of liquid lubricants, a liquid lubricant mechanism is applied as follows:

1. To provide the initial wear protection, bearing ring internal surfaces 52 are modified for optimal friction and wear by anelectroplating process. For example, if bearing rings 42 and 44 are made of structural aluminum such as 6061-T6 or 7075-T6, a hard anodizing coating, type 3, with an organic polymer, such as polytetrafluoroethylene (PTFE), sealing is applied.

2. In addition, synthetic hydrocarbon base oils such as polyalphaolephines (PAO) or multiply-alkylated cyclopentanes (MACs Multiply-Alkylated Cyclopentanes) with wear protection additives such as lead napthenate or tricresyl phosphate show good lubricity and low wear in a slow-to-moderate speed application as this thrust ball bearings. Greases or oils can be used. The proper choice of these forms of lubricants depends on allowable resistance bearing torque, operating temperature, speed, and torque noise.

3. Retainer material is a molded, synthetic resin such as polyamide (PA) or polyetherether ketone (PEEK) or polyamide-imide PAI with added fillers such as glass fiber or carbon fiber to increase strength and to reduce wear rate.

4. The proper amount of lubricant resupply is controlled by retainer material, interface clearances, environmental operating conditions and bearing kinematic relationship between the bearing components.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

More specifically, for a large solid, single-piece retainer, the tolerance on out-of-round and out-of-flatness is extremely tight in order to avoid the retainer locking due to ball/retainer interactions.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

What is claimed is:

1. A ball bearing assembly comprising (a) a top circular ring and a bottom circular ring, each said ring having ball bearing raceways which raceways face one another and (b) a ball bearing retainer which supports a plurality of ball bearings, which is sandwiched between said top ring and said bottom ring and which enables said ball bearings to reside within said raceways, in which said retainer comprises a plurality of arced segments which together form a circle, wherein said retainer is provided with pockets for said ball bearings, and wherein said retainer ball pockets are selected to have a cross-section with its major axis along its circumferential direction in which its semi-major axis dimension, a, is calculated according to the below formula:

$$a = b + \frac{\pi d}{n_{segment}}(\alpha_{retainer} - \alpha_{raceway})(T_{hot} - T_{cold}) + tol$$

where
b=dball*ratio, mm
dball=ball diameter, mm
ratio=1.025-1.10, mm
d=bearing pitch diameter, mm
nsegment=number of retainer segments per bearing row
Thot=extreme operating hot temperature, ° C.
Tcold=extreme operating cold temperature, ° C.
αretainer=thermal coefficient of expansion for ball retainer material along the circumferential direction, 1/° C.
αraceway=thermal coefficient of expansion for raceway material, 1/° C.
tol=pocket diametral manufacturing tolerance, mm.

2. The ball bearing assembly according to claim 1 wherein each of said retainer segments have ends respectively contacting adjacent ones of said segments and wherein each of said segment ends are rounded so as to minimize any radially transferring forces and any retainer wear between adjacent ones of said segments.

3. The ball bearing assembly according to claim 1 in which the number of said retainer arced segments is accordingly selected to reduce any thermal induced effects on torque, sliding friction torque and dynamics induced effects amongst said retainer segments, said rings and said ball bearings.

4. The ball bearing assembly according to claim 3 wherein each of said retainer segments have ends respectively contacting adjacent ones of said segments and wherein each of said segment ends are rounded so as to minimize any radially transferring forces and any retainer wear between adjacent ones of said segments.

5. The ball bearing assembly according to claim 1 wherein:
said top and bottom rings each include shoulders surrounding said raceways; and
said pockets have wedges on which said ball bearings reside whereby said pocket wedges prevent said retainer segments from simultaneously contacting said bottom ring raceway shoulders and top raceway shoulders.

6. The ball bearing assembly according to claim 5 wherein said retainer pockets of said top and bottom rings have circular cross-sections.

7. The ball bearing assembly according to claim 5 wherein said retainer pockets of said top and bottom rings have oval cross-sections.

8. The ball bearing assembly according to claim 5 wherein:
said ball bearings and said retainer pockets have interfaces therebetween; and
said retainer pockets have slots therein for increasing compliance between said ball/pocket interfaces for helping to reduce any dynamic induced effects between said ball bearings and said pockets.

9. The ball bearing assembly according to claim 1 in which said rings include raceways for said ball bearings,
solid lubricants are included in said pockets,
said bearing ring raceways have electroplated surfaces, and
an organic polymer sealing material is applied to said pockets and to said raceways to optimize any friction and wear thereamongst.

10. The ball bearing assembly according to claim 9 in which said raceways are covered with a molecular thin layer comprising a per-fluorinated polyether.

11. The ball bearing assembly according to claim 9 further including a molecular thin layer of a per-fluorinated polyether covering said raceways.

12. The ball bearing assembly according to claim 9 in which:
said ball bearings and said retainer pockets have bearing component interfaces therebetween; and
said retainer is formed from materials selected to act as and thus to form said retainer as a lubricant resupply reservoir for providing any needed lubricant to all said bearing component interfaces through kinematic contact therebetween.

13. The ball bearing assembly according to claim 12 in which said retainer materials comprise one of a molded, synthetic resin, self-lubricated material reinforced with carbon fiber, molybdenum disulfide, and polytetrafluoroethylene (PTFE).

14. The ball bearing assembly according to claim 12 in which said lubricant resupply reservoir is made sufficient in amount as controlled by said retainer material, the interface clearances, existing environmental operating conditions and such bearing kinematic relationships as exist between said retainer segments, said rings and said ball bearings.

15. The ball bearing assembly according to claim 12 in which said bearing rings have internal surfaces which are modified for optimal friction and wear by being electroplated and enhanced with applied polytetrafluoroethylene (PTFE) sealing.

16. The ball bearing assembly according to claim 12 further including synthetic hydrocarbon base oils with wear protection additives for application in slow-to-moderate speed use with respect to said ball bearings.

17. The ball bearing assembly according to claim 16 in which said synthetic hydrocarbon base oils comprise polyalphaolephines (PAO) or multiply-alkylated cyclopentanes (MACs Multiply-Alkylated Cyclopentanes) and said wear protection additives comprise lead napthenate or tricresyl phosphate and further including greases and oils as necessary depending on allowable resistance bearing torque, operating temperature, speed and torque noise.

18. The ball bearing assembly according to claim 16 in which said retainer material comprises a synthetic resin with at least one added filler for increased strength of said retainer and for reducing wear rate thereof.

19. The ball bearing assembly according to claim 18 wherein said synthetic resin is selected from one of a polyamide (PA), a polyetherether ketone (PEEK) and a polyamide-imide PAI.

20. The ball bearing assembly according to claim 19 wherein said filler is selected from one of glass fiber and carbon fiber.

21. A ball bearing assembly comprising (a) a top circular ring and a bottom circular ring, each said ring having ball bearing raceways which raceways face one another and (b) a ball bearing retainer which supports a plurality of ball bearings, which is sandwiched between said top ring and said bottom ring and which enables said ball bearings to reside within said raceways, and in which said retainer comprises a plurality of arced segments which together form a circle, and wherein each of said retainer segments have ends respectively contacting adjacent ones of said segments and wherein each of said segment ends are rounded so as to minimize any radially transferring forces and any retainer wear between adjacent ones of said segments, and in which the rounding of said ends are provided with two orthogonally directed radii for minimizing any such radially transferring forces and any such retainer wear between said adjacent ones of said segments.

22. The ball bearing assembly according to claim 21 wherein said retainer is provided with pockets for said ball bearings and is formed from materials selected to act as a lubricant resupply reservoir for providing any needed lubricant to all said bearing component interfaces and, in the case of excessive thermal induced dimensional change due to a combination of excessive mismatch between the coefficients of thermal expansion between said raceway and said retainer materials and extreme operating temperature, said retainer ball pockets are selected to have an oval cross-section with its major axis along its circumferential direction in which its semi-major axis dimension, a, is calculated according to the below formula:

$$a = b + \frac{\pi d}{n_{segment}}(\alpha_{retainer} - \alpha_{raceway})(T_{hot} - T_{cold}) + tol$$

where
$b = d_{ball} *$ratio, mm
$d_{ball}$=ball diameter, mm
ratio=1.025-1.10, mm
d=bearing pitch diameter, mm
$n_{segment}$=number of retainer segments per bearing row
$T_{hot}$=extreme operating hot temperature, ° C.
$T_{cold}$=extreme operating cold temperature, ° C.
$\alpha_{retainer}$=thermal coefficient of expansion for ball retainer material along the circumferential direction, 1/° C.
$\alpha_{raceway}$=thermal coefficient of expansion for raceway material, 1/° C.
tol=pocket diametral manufacturing tolerance, mm.

23. A ball bearing assembly comprising (a) a top circular ring and a bottom circular ring, each said ring having ball bearing raceways which raceways face one another and (b) a ball bearing retainer which supports a plurality of ball bearings, which is sandwiched between said top ring and said bottom ring and which enables said ball bearings to reside within said raceways, in which said retainer comprises a plurality of arced segments which together form a circle, in which the number of said retainer arced segments is accordingly selected to reduce any thermal induced effects on torque, sliding friction torque and dynamics induced effects amongst said retainer segments, said rings and said ball bearings, and wherein each of said retainer segments have ends respectively contacting adjacent ones of said segments and wherein each of said segment ends are rounded so as to minimize any radially transferring forces and any retainer wear between adjacent ones of said segments in which the rounding of said ends are provided with two orthogonally directed radii for minimizing any such radially transferring forces and any such retainer wear between said adjacent ones of said segments.

* * * * *